Sept. 21, 1943. T. F. McMANAMEN ET AL 2,330,133
WHEEL
Filed July 3, 1942 2 Sheets-Sheet 1

Inventor
Thomas F. McManamen
Leon White
By Clarence A. O'Brien
and Harvey B. Jacobson
Attorneys Sept. 21, 1943.  T. F. McMANAMEN ET AL  2,330,133
WHEEL
Filed July 3, 1942   2 Sheets-Sheet 2

Inventor
Thomas F. McManamen
Leon White
By Clarence A. O'Brien
Attorney

Patented Sept. 21, 1943

2,330,133

UNITED STATES PATENT OFFICE 2,330,133

WHEEL

Thomas F. McManamen and Leon White, Gillette, Wyo.

Application July 3, 1942, Serial No. 449,624

2 Claims. (Cl. 301—45)

This invention relates to new and useful improvements in wheels such as may be used on vehicles of various kinds.

The principal object of the present invention is to provide a wheel having a tread construction which will absorb the shock of traveling over ruts, rocks and other uneven surfaces to a considerable degree.

Another important object of the invention is to provide a wheel tread construction which is especially adapted for tractors and farm vehicles, which must travel over uneven surfaces.

Various other important objects and advantages of the invention will become apparent to the reader of the following description.

Figure 1:
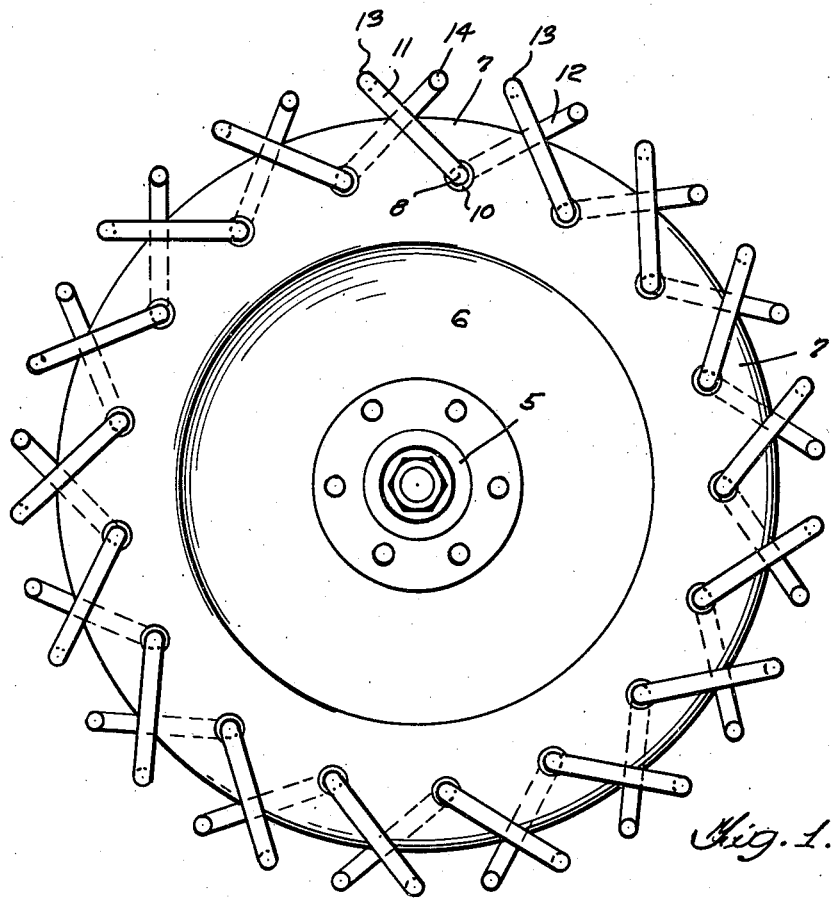
Figure 1 represents a side elevational view of the wheel.
Figure 2:
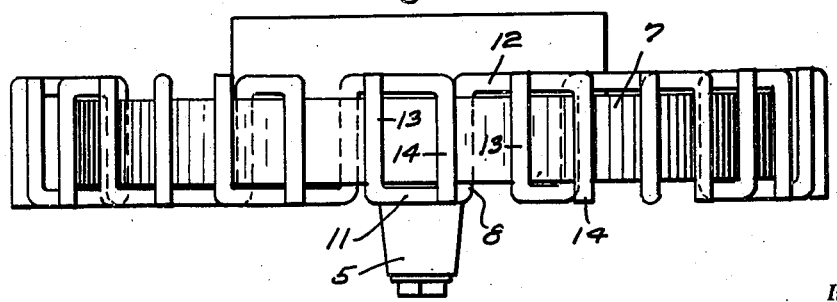
Figure 2 is a top plan view.

Referring to the drawings wherein like numerals designate like parts, it can be seen in the drawings that numeral 5 denotes a hub structure, while numeral 6 denotes a wheel disk, which in the present instance may form the entire wheel, the peripheral portion being enlarged, as at 7. It is possible to construct this wheel of wood or some other inexpensive material, as the wear on the periphery thereof is negligible.

The tread structure embraces a multiplicity of interlaced or inter-related tread members, each being constructed of suitable wear resisting metal and being constructed in such a manner that they define small levers which effect a leverage action of the wheel over uneven surfaces.

In construction each of these tread units comprises a shaft 8 disposed through a bushing 9 set in a transverse bore 10 of the enlarged portion 7 of the wheel 6.

At one end of the shaft 8 is a laterally disposed arm 11, while at the other end of the shaft 8 is a second laterally disposed arm 12. The second arm 12 is disposed at substantially right angles to the arm 11 and these arms have inwardly disposed tread bars 13, 14 which are disposed across the peripheral portion of the wheel.

Figure 3:
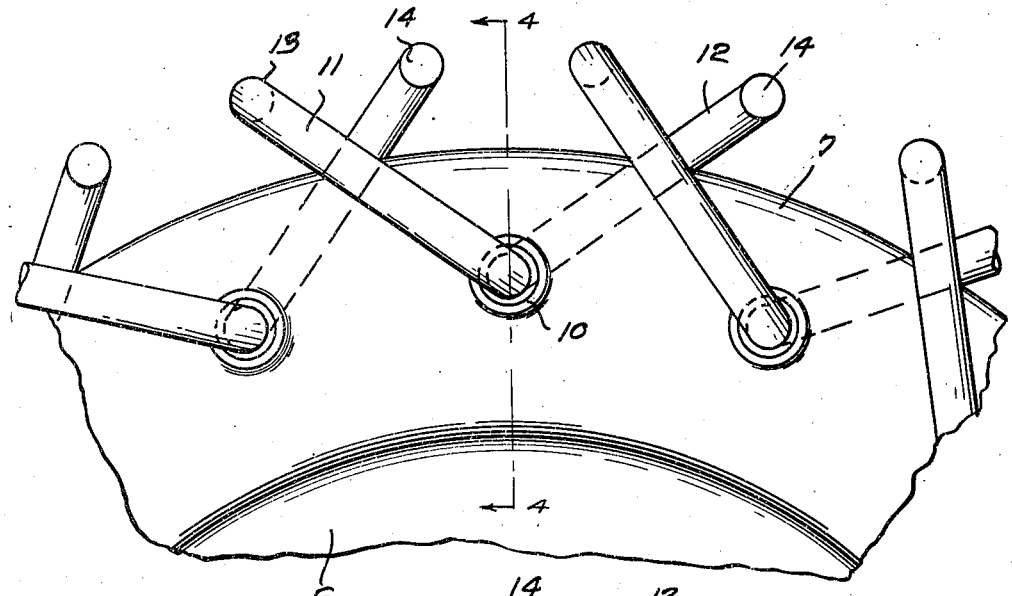
Figure 3 is an enlarged side elevational view.
Figure 4:
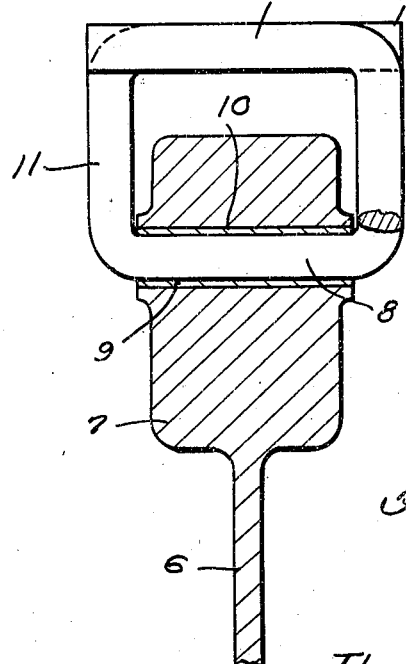
Figure 4 is a section taken substantially on line 4—4 of Figure 3.

As can be seen in Figures 1 and 3, the arms 11, 12 of one unit interlap the arms of adjacent units.

Obviously, this wheel in operation will ride on the tread bars 13, 14 and will develop what may be construed as a leverage action in riding bumps, hollows and other uneven surfaces, as when the wheel strikes, for instance, a rise, the contacting tread bars recede while their corresponding tread bars will descend, to the end that there will be no drop when the vehicle rides over the rise and the same action takes place inversely when the wheel passes over a depression.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a wheel of the character described having a peripheral portion, tread members spaced apart equidistantly around said portion and each comprising a shaft extending transversely through the portion and journaled therein for rocking movement, a pair of relatively divergent arms extending from said shaft on opposite sides of said peripheral portion, respectively, outwardly beyond said portion and each terminating in a right angled tread element extending across said peripheral portion.

2. In a wheel of the character described having a peripheral portion, tread members spaced apart equidistantly around said portion and each comprising a shaft extending transversely through the portion and journaled therein for rocking movement, a pair of relatively divergent arms extending from said shaft on opposite sides of said peripheral portion, respectively, outwardly beyond said portion and each terminating in a right angled tread element extending across said peripheral portion, the arms of each tread member being disposed crosswise of adjacent arms of the members on each side thereof.

THOMAS F. McMANAMEN.
LEON WHITE.